July 7, 1964 M. W. BEARDSLEY 3,139,947
AIR CUSHION VEHICLE FOR TRAVELLING OVER IRREGULAR TERRAIN
Filed April 24, 1961 2 Sheets-Sheet 1
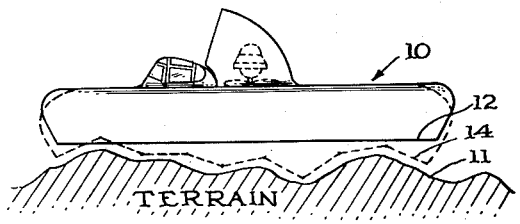
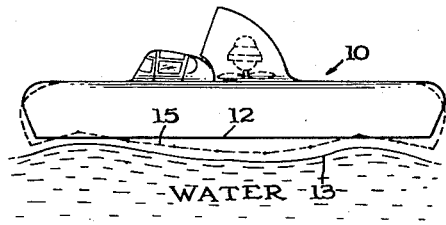
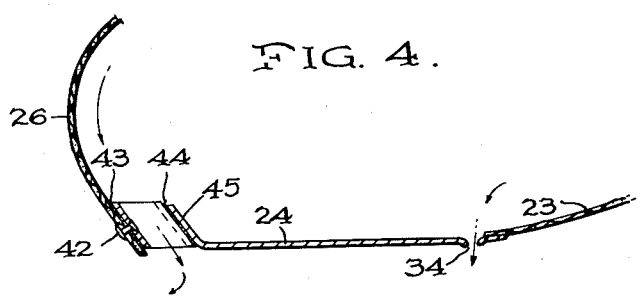
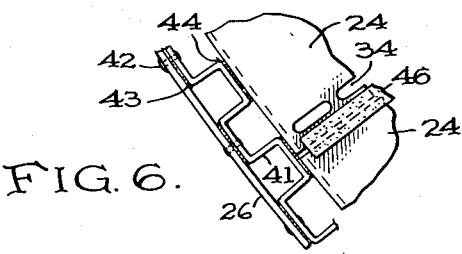
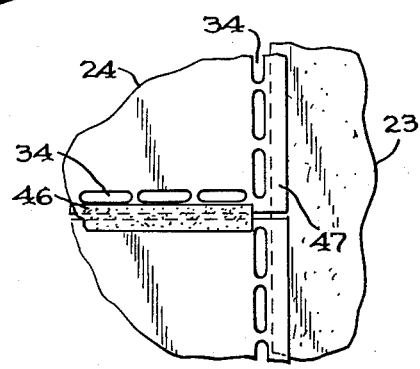
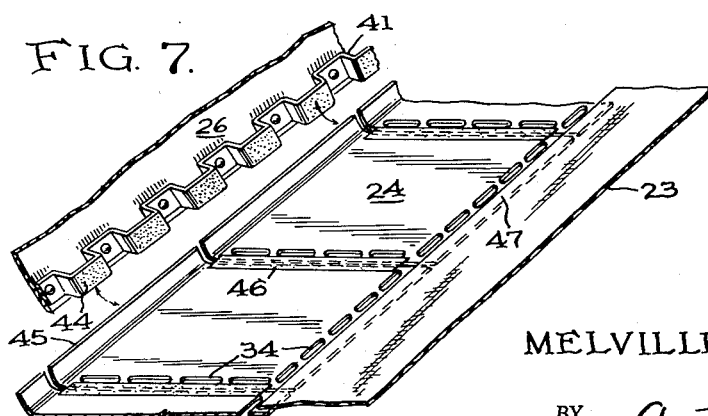
INVENTOR
MELVILLE W. BEARDSLEY
BY *A. Fred Starobin*
ATTORNEY July 7, 1964 M. W. BEARDSLEY 3,139,947
AIR CUSHION VEHICLE FOR TRAVELLING OVER IRREGULAR TERRAIN
Filed April 24, 1961 2 Sheets-Sheet 2
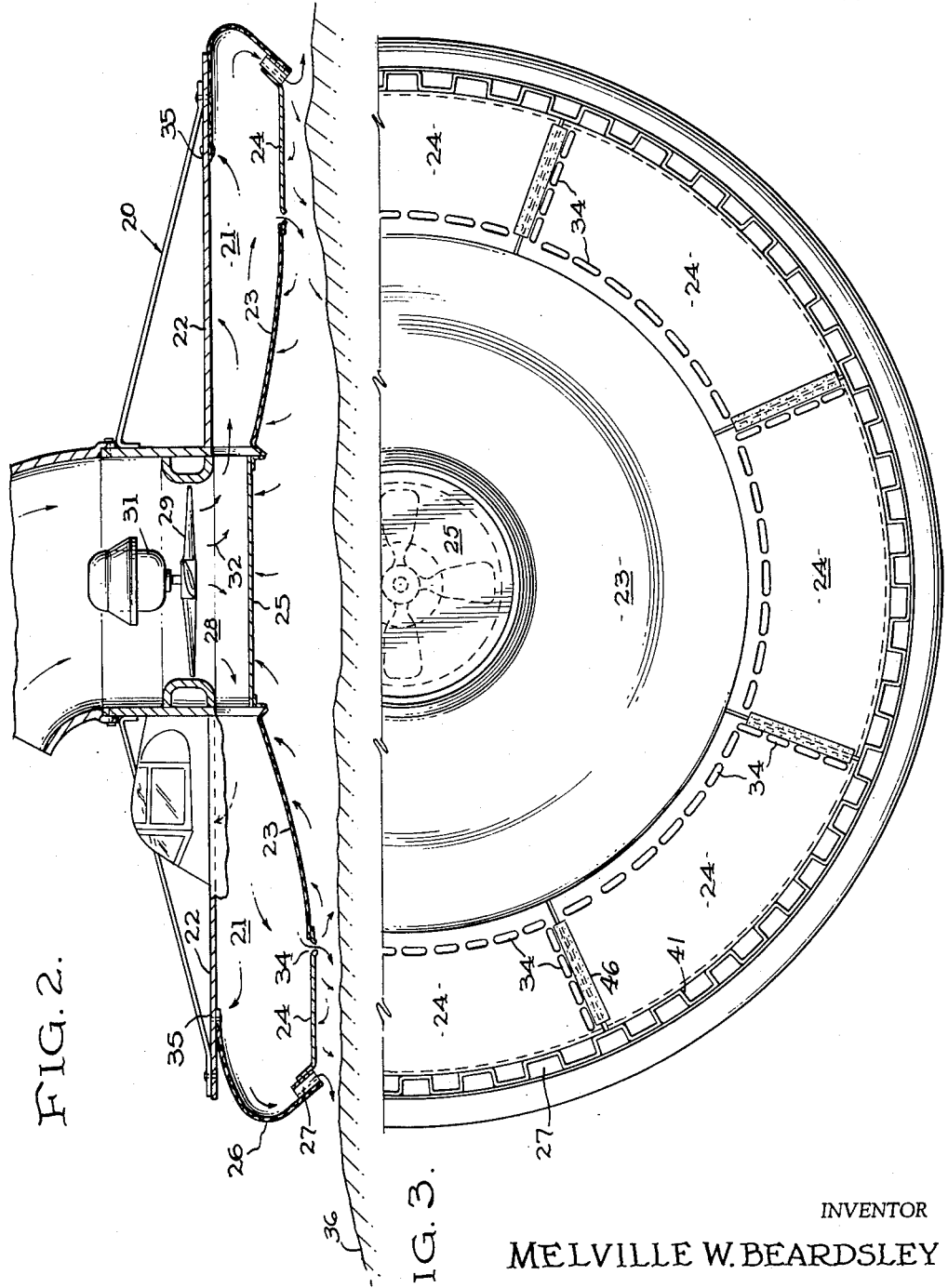
INVENTOR
MELVILLE W. BEARDSLEY
BY
ATTORNEY United States Patent Office 3,139,947
Patented July 7, 1964

3,139,947
AIR CUSHION VEHICLE FOR TRAVELLING OVER IRREGULAR TERRAIN
Melville W. Beardsley, Severna Park, Md., assignor, by mesne assignments, to National Research Associates, Inc., Laurel, Md., a corporation of Maryland
Filed Apr. 24, 1961, Ser. No. 105,171
5 Claims. (Cl. 180—7)

The present invention relates to air cushion vehicles which travel over land or water and have construction which may be adapted to automotive land vehicles, ships, aircraft or to a combination of such vehicles.

One of the outstanding advantages of the present invention resides in its ability to maintain a vehicle periphery at a substantially uniform height above and in conformance with the profile of a ground surface even when operating over irregular terrain.

It is also an object of this invention to minimize the power required to operate an air cushion vehicle over irregular terrain without any contact therewith.

It is a further object of this invention to construct an air cushion vehicle which may be used to provide its personnel and cargo with the smoothest possible ride by having minimum vertical accelerations when traveling over rolling or irregular terrain.

It is a further object of the present invention to enable an air cushion vehicle to operate at high speed over irregular terrain or rough water by eliminating the drag caused by contact with the surface over which it is operating.

It is still another object of the present invention to minimize pitching moments and oscillations in an air cushion vehicle which may be produced in travel over water surfaces or rolling terrain.

It is a still further object of the present invention to decrease the overall weight and cost of the air cushion vehicle.

Accordingly, the present invention is directed to a means to prevent contact between the bottom of the vehicle and irregular terrain over which it is operating.

Basically the present invention provides a novel and improved combination of the flexible structural material and an arrangement of nozzle slots from which a working fluid is discharged. This construction causes the bottom of the vehicle to conform in shape to the profile of the surface of the ground or water under it so as to maintain the height of each portion of the peripheral jet sheet ejection nozzle at a substantially constant height above the surface beneath it.

Numerous other advantages and objects of the invention will become apparent to those skilled in the art from the detailed description of the invention, reference being had to the accompanying drawings, wherein:

FIGS. 1 and 1a show comparative air cushion vehicles of the rigid type and the type of the present invention traveling over ground terrain and water, respectively;

FIG. 2 shows a cut-away view of a side elevation of an air cushion vehicle of the present invention;

FIG. 3 shows a partial bottom view of the air cushion vehicle of FIG. 2;

FIG. 4 shows a sectioned view of a part of the side and bottom of the air cushion vehicle of FIG. 2;

FIGS. 5, 6 and 7 show fragmentary views of bottom parts of the air cushion vehicle of FIG. 2.

The value of this invention is apparent from an analysis of the operation of an air cushion vehicle 10 over irregular terrain or over water waves. Referring to FIG. 1, an air cushion vehicle 10 is illustrated traveling over irregular ground terrain 11. In order to traverse this type of terrain, an air cushion vehicle of rigid structure as constructed up to the present time and shown in the figure by the solid lines, must operate at a height which maintains the bottom 12 at a level at least equal to the highest irregularity over which it must travel. FIG. 1a shows the same rigid type of vehicle 10 traveling over water with the surface having rolling waves 13. Again the rigid vehicle must operate at a height which maintains the bottom 12 at a level at least equal to the tops of the waves over which it must travel. The effective operating height which determines the requirement for air flow and applied power is a mean, though not the arithmetic average, between the high point and the low point of the surface, land or water, over which the vehicle travels. For example, if the high point is at a level 10 inches above the low point, the effective operating height might be in the order of 6 or 7 inches depending upon the terrain profile. In other words, the vehicle would be required to apply the same power necessary to operate at a height of 6 or 7 inches above a perfectly smooth surface.

If, in accordance with the present invention, the vehicle's bottom is constructed to conform to the terrain or wave profile, as shown by the dashed lines 14 and 15 in FIGS. 1 and 1a, respectively, a greatly reduced operating height of perhaps 2 inches would be satisfactory so that the required power may be greatly reduced. From another point of view a greater load can be carried or a rougher terrain can be traversed by a vehicle of the present invention as compared with a rigid structure vehicle of the same power and size.

With the present invention it is possible to construct a vehicle which will avoid contact with a water surface and thereby prevent possible damage to the vehicle, but consideration should be given to the fact that even if the vehicle is structurally capable of absorbing water impact without damage, it is mandatory that water contact be prevented if the advantage of greater speeds is to be maintained. This requirement becomes apparent when it is appreciated that due to relative densities skin friction drag caused by water is approximately 840 times the drag caused by air. For further emphasis it may be pointed out that at 100 miles per hour the skin friction drag of water acting on only one square foot of surface requires approximately 12 thrust horsepower to be overcome as compared with approximately 0.015 horsepower per square foot required to overcome the skin friction of air moving at 100 miles per hour relative to the vehicle's surface.

An embodiment of the present invention in simple form is illustrated in FIG. 2 in the shape of an air cushion vehicle of circular plan form. The vehicle 20, as illustrated in FIGS. 2 and 3, comprises a plenum 21 having a rigid upper surface 22 and a bottom surface comprised of a flexible membrane inner surface 23 and attached rigid surface segments 24 annularly surrounding it. The center surface 25 of the plenum bottom is a rigid material but might also be flexible in some embodiments of the invention. The plenum 21 is surrounded by a flexible membrane 26 attached to the upper surface 22 and the outside of nozzle 27. Air is blown into the plenum 21 through an opening 28 in the top surface of plenum 21 by a fan 29 driven by a directly connected engine 31. Entering the plenum 21 vertically downward, as indicated by arrows 32, the air flow is deflected horizontally outward by the bottom center surface 25. The flow moves outwardly through plenum 21 at a decreasing velocity and is discharged through the main nozzle slot 27 and the stability slots 34. As air is blown into plenum 21 it inflates vertically due to the pressure generated in it.

As described in my co-pending applications, Ser. No. 650,583 and 845,943, the discharge of a jet sheet of air through a peripheral nozzle slot 27 causes a pressure to be developed under the base area comprised of the flexible membrane in a surface 23, the rigid surface segments 24 and the center surface 25 surrounded by nozzle slot 27. As also described in my co-pending application, Ser. No. 845,943, the flow through the stability slots 34 surrounding the stability pads, rigid surface segments 24, provides stability causing the vehicle to maintain an equilibrium attitude parallel to the ground surface under it.

Stability is achieved by virtue of the fact that the pressure under each rigid surface segment 24 is inversely proportional to its height above the ground surface. Thus, for the same upward pressure each rigid surface segment 24 must be at the same height. The rigid surface segments 24 are connected to each other and to the flexible bottom surface 23 by flexible linkages illustrated in detail in FIGS. 4, 5, 6 and 7, so that they are free to move relative to each other and to the rest of the vehicle structure.

The upper edge of flexible membrane 26 surrounding the plenum 21 is attached to the rigid upper plenum surface 22 at a point 35 located inward from the outer edge of surface 22. When the vehicle 20 is operating under light or "no-load" conditions, the interior pressure in plenum 21 causes it to expand vertically so that there is no contact between the flexible membrane 26 and the rigid upper surface 22 at any point outwardly from point 35. An analysis of the forces involved reveals that the weight of the load and the vehicle 20, exclusive of the plenum side 26 and bottom surfaces 23, 24 and 25, are supported by the interior plenum pressure acting upward on fan 29 and rigid upper plenum surface 22 inward from connection point 35. For a constant internal pressure as the pressure under the bottom increases due to increased loads, the surface of contact between the flexible plenum membrane 26 and rigid upper plenum surface 22 increases. In other words, increased loads cause the plenum 21 to be flattened due to the increased vertical forces acting on it from above and below.

For the sake of simplicity in the preceding analysis, the pressure under the rigid surface segments 24 was assumed to be the same as the pressure under the remainder of the bottom surfaces 23 and 25. This assumption is substantially correct for the equilibrium condition where the vehicle is above a level ground surface. The major benefits of this invention are derived, however, in operation over irregular ground surfaces, as indicated in FIG. 2 which illustrates the same vehicle moving from left to right and encountering a rise in the ground surface 36. The pressure under the rigid surface segments 24 directly over this rise in the ground surface is increased by the decreasing height of segments 24 over ground surface 36 so that they move upward relative to the other segments 24 and the rest of the vehicle 20 structure. In this manner the edge of vehicle 20 is prevented from contacting the raised ground surface 36 as would occur if the vehicle were of an entirely rigid structure. The upward movement of the rigid surface segments 24 is made possible by their flexible linkage connection to the rest of the vehicle structure and to the flexibility of flexible membrane 26 surrounding plenum 21. It will be noted that as the flexible membrane 26 above the raised rigid surface segments 24 is deflected upward, an increased portion of its surface comes in contact with the outer rim of upper rigid plenum surface 22 providing an increase in the area acted upon by the interior plenum pressure. This increased force on the edge of vehicle 20 causes an upward pitching moment tending to assist the vehicle 20 in passing over the rise in ground surface 36.

The flexible linkages are disclosed in detail in FIGS. 4, 5, 6 and 7. Rigid surface segment 24 is attached to rigid spacer 41 which, in the embodiment shown, is a substantially sinusoidially-shaped piece of metal attached by rivets 42 and adhesive layers 43 to flexible membrane 26 and by adhesive layers 44 to rigid surface segments 24. The rivet and adhesive type of attachment shown in FIGS. 4 and 7 allow flexibility between the sides and bottom of vehicle 20. Adhesive strips 45 attaching adhesive layers 44 on metal spacer 41 to rigid surface segments 24 is notched to permit bending at the flexible hinge connection. Rigid surface segments 24 are connected to each other by means of a flexible tape hinge 46 and to flexible bottom surface 23 by adhesive attachment 47. The tap and adhesive attachment is so placed, as illustrated in FIGS. 5, 6 and 7, as not to interfere with slots 34 through which air flow takes place for lifting and stability of vehicle 20. Although the embodiment of the present invention is illustrated as used in an air cushion vehicle of circular plan form, it will be appreciated by those skilled in the art that it may also be applied to vehicles having other plan forms such as a rectangular shape. It should also be understood that this invention in other embodiments may be applied along the longitudinal side portions of the bottom of an air cushion vehicle having the front and rear portions of the air cushion enclosed by other means, such as a flexible membrane flap or a lateral jet sheet of air.

Tests have shown the importance of a small effective operating height. A much larger gross weight can be carried at the lower operating height. For instance, the allowable gross weight at an operating height of 2 feet has been found to be approximately 250% of the gross weight supportable at an operating height of 7 feet when the vehicle is operating at a speed of 100 miles per hour. Since the present invention makes possible the traverse without surface contact of irregular terrain and sizable water waves with a small effecting operating height, it greatly increased the utility of air cushion vehicles. Therefore, it will be apparent that additional benefits due to the reduced air flow required will be reductions in weight through the use of smaller and lighter fans and engines, cost, and space required for ducting. The reduction in ducting space leaves more space available for carrying personnel and cargo.

From the foregoing, varied application of the novel aspects of the invention will occur to those skilled in the art and variations in matters of detail will be apparent. Therefore, it is appropriate that the appended claims be accorded a latitude of interpretation consistent with the spirit and scope of the invention.

What is claimed is:

1. An air cushion vehicle comprising a plenum shell, means to blow air into said plenum shell, a bottom surface under said shell, said plenum shell comprising an impervious flexible side wall, and a substantially horizontal rigid top surface linearly connected to said flexible side wall, said bottom surface comprising a center section of substantially impervious material fixedly secured to said top surface material, a flexible area of substantially impervious material substantially concentric with said center section and attached thereto, and rigid sections located on the periphery of said flexible area and flexibly attached thereto and to each other, the outer edges of said rigid sections spaced from the bottom of said flexible side wall and attached thereto whereby parts of said bottom surface are permitted to move vertically in relation to each other and to other parts of the vehicle as the vehicle passes over an irregular ground surface.

2. The air cushion vehicle of claim 1 further characterized by said rigid sections having openings substantially along an edge whereby air blown into said plenum shell may flow downwardly around said sections.

3. The air cushion vehicle of claim 1 further characterized by a rigid spacer between said rigid sections and said side wall and attached to said sections and said wall.

4. The air cushion vehicle of claim 3 further characterized by said rigid spacer having a sinusoidal shape.

5. The air cushion vehicle of claim 1 further characterized by said horizontal rigid top surface overlapping a portion of said side wall.

References Cited in the file of this patent

FOREIGN PATENTS 1,238,499    France ------------------ July 4, 1960

OTHER REFERENCES

Publication "Design News," May 23, 1960; pages 6 and 7.